(12) United States Patent
Witts et al.

(10) Patent No.: US 12,074,479 B2
(45) Date of Patent: Aug. 27, 2024

(54) SENSOR ASSEMBLY FOR AN ELECTRIC MACHINE

(71) Applicant: Kyocera AVX Components (Werne) GmbH, Werne (DE)

(72) Inventors: David Witts, Cambridge (GB); Peter Constantinou, Cambridge (GB); Jonathan Michael Hayes, Cambridge (GB)

(73) Assignee: Kyocera AVX Components (Werne) GmbH, Werne (DE)

( * ) Notice: Subject to any disclaimer, the term of this patent is extended or adjusted under 35 U.S.C. 154(b) by 548 days.

(21) Appl. No.: 17/090,225

(22) Filed: Nov. 5, 2020

(65) Prior Publication Data

US 2021/0391774 A1    Dec. 16, 2021

Related U.S. Application Data

(60) Provisional application No. 63/037,647, filed on Jun. 11, 2020.

(51) Int. Cl.
*H02K 11/225* (2016.01)
*G01D 5/20* (2006.01)
*H02K 11/25* (2016.01)

(52) U.S. Cl.
CPC ......... *H02K 11/225* (2016.01); *G01D 5/2073* (2013.01); *H02K 11/25* (2016.01)

(58) Field of Classification Search
CPC .................................................. G01D 5/2073
See application file for complete search history.

(56) References Cited

U.S. PATENT DOCUMENTS

| 2019/0011537 A1* | 1/2019 | Utermoehlen ......... G01D 5/145 |
| 2019/0162561 A1 | 5/2019 | Obukhov et al. |

FOREIGN PATENT DOCUMENTS

| DE | 102007033881 A1 * | 1/2009 | ............. G01D 5/208 |
| DE | 102018213410 A1 | 2/2020 | |
| DE | 102018213411 A1 * | 2/2020 | ............. G01D 21/00 |
| EP | 0902265 A1 | 3/1999 | |
| EP | 2853873 A1 | 4/2015 | |

OTHER PUBLICATIONS

International Search Report and Written Opinion for Application No. PCT/IB2021/054545, mailed Jul. 26, 2021, 13 pages.

* cited by examiner

*Primary Examiner* — Walter L Lindsay, Jr.
*Assistant Examiner* — Milton Gonzalez
(74) *Attorney, Agent, or Firm* — Dority & Manning, P.A.

(57) ABSTRACT

A sensor assembly for an electric machine includes a position sensor mounted to the stator. The sensor assembly further includes a target configured to be inductively coupled to a transmit coil of the position sensor and a plurality of receive coils of the position sensor when the target passes the position sensor during a revolution of the rotor relative to the stator. The sensor assembly includes a circuit mounted to the rotor. The sensor assembly further includes a power generation element on the rotor. The power generation element generates electrical power needed for powering electronic components of the circuit based on an inductive coupling with the transmit coil when the power generation element passes the position sensor during the revolution of the rotor. The electronic components can include a sensor configured to obtain data that can be communicated to the position sensor mounted to the stator.

9 Claims, 10 Drawing Sheets

SENSOR ASSEMBLY FOR AN ELECTRIC MACHINE

PRIORITY CLAIM

The present application claims the benefit of priority of U.S. Provisional App. No. 63/037,647, titled "Sensor Assembly for an Electric Machine," having a filing date of Jun. 11, 2020, which is incorporated by reference herein.

FIELD

The present disclosure relates generally to a sensor assembly for an electric machine.

BACKGROUND

An electric machine (e.g., motor, generator) can include a stator and a rotor. The rotor can be rotated relative to the stator as a result of electromotive forces between the stator and the rotor. The electromotive forces between the stator and the rotor can cause the temperature of the electric machine to increase. For example, the rotor can include windings, and the electromotive forces between the stator and the rotor can induce an electric current in the windings and thereby increase the temperature of the windings. Alternatively, the rotor can include one or more permanent magnets, and the electromotive forces can cause the temperature of the one or more permanent magnets to increase.

The increase in temperature of the rotor due to the electromotive forces can, in some instances, affect the performance of components (e.g., windings, permanent magnets) of the rotor. For instance, the electromotive forces can cause the temperature of the rotor to increase such that insulation for the windings begins to breakdown. Alternatively, the electromotive forces can cause the temperature of the rotor to increase such that the permanent magnets become demagnetized.

The temperature of the rotor can be estimated based, at least in part, on temperature readings for the stator. Alternatively, or additionally, the temperature of the rotor can be estimated based, at least in part, on one or more parameters (e.g., magnitude) associated with the electric current induced in the windings of the rotor. However, a more accurate measurement of the temperature of the rotor is desired to avoid instances in which the increase in the temperature of the rotor due to the electromotive forces causes components (e.g., windings, permanent magnets) of the rotor to degrade.

SUMMARY

Aspects and advantages of embodiments of the present disclosure will be set forth in part in the following description, or may be learned from the description, or may be learned through practice of the embodiments.

In one aspect, a sensor assembly for an electric machine that includes a stator and a rotor is provided. The sensor assembly includes a position sensor mounted to the stator. The position sensor includes a transmit coil and a plurality of receive coils. The sensor assembly includes a target configured to be inductively coupled to the transmit coil and the plurality of receive coils when the target passes the position sensor during a revolution of the rotor relative to the stator. The sensor assembly includes a first circuit mounted to the stator. The first circuit is operable to determine data indicative of a position of the rotor based, at least in part, on a measurement signal induced in at least one of the transmit coil and the plurality of receive coils when the target passes the position sensor. The sensor assembly includes a second circuit mounted to the rotor. The second circuit includes one or more electronic components associated with monitoring one or more parameters of the rotor. The sensor assembly further includes a power generation element configured to generate electrical power needed for powering the one or more electronic components based, at least in part, on an inductive coupling with the transmit coil when the power generation element passes the position sensor during the revolution of the rotor.

In another aspect, a method for communicating data associated with a rotor of an electric machine to a position sensor mounted to a stator of the electric machine is provided. The method includes generating, by a power generation element, electrical power for powering one or more electronic components of a circuit mounted to the rotor based, at least in part, on an inductive coupling between the power generation element and a transmit coil of the position sensor during a revolution of the rotor relative to the stator. The method further includes obtaining, via one or more processors of the circuit, data associated with at least one sensor of the circuit. The method even further includes communicating, via the one or more processors, the data to the position sensor via the power generation element or a communication coil on the rotor.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
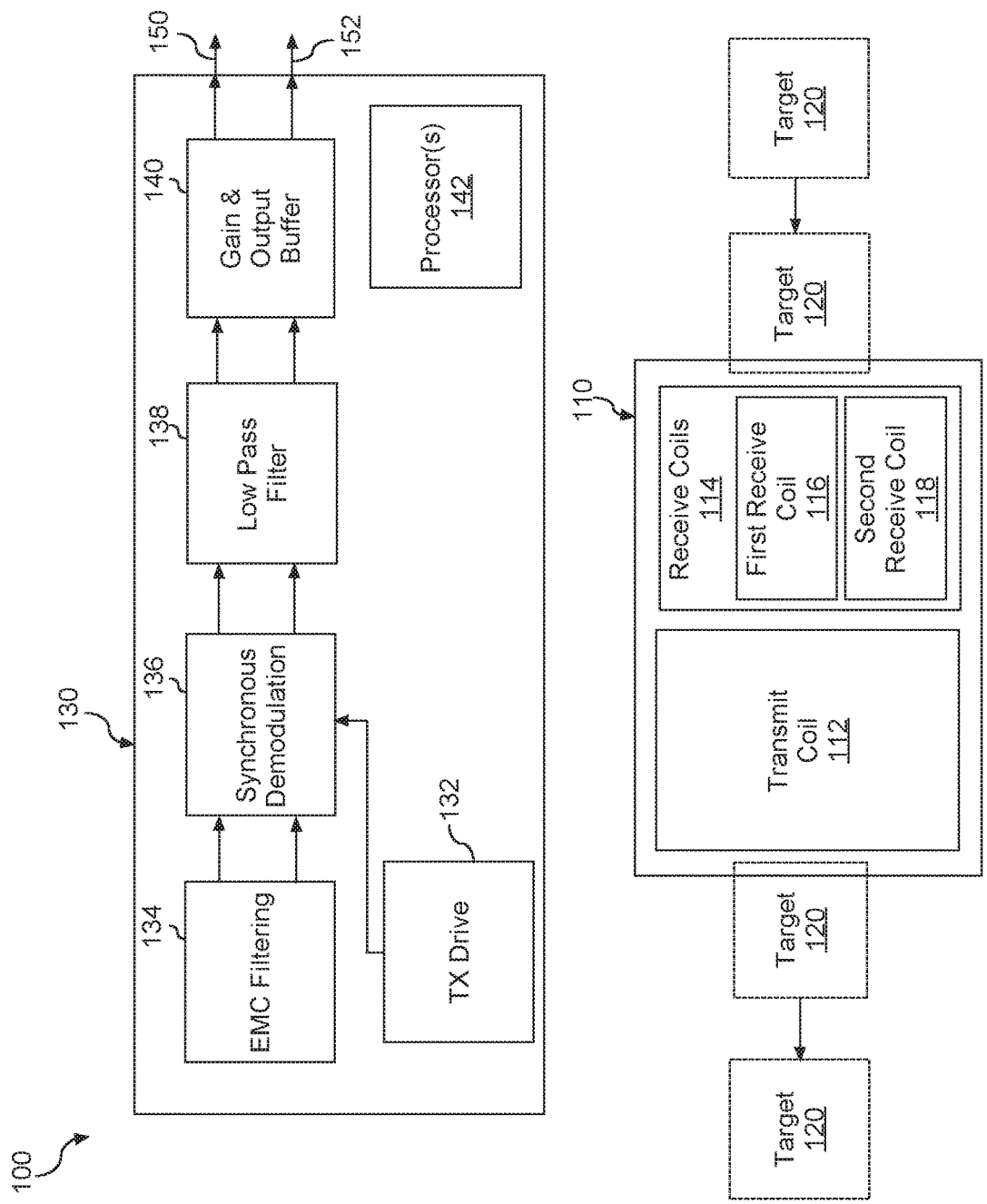
FIG. 1 depicts components of a position measurement system according to example embodiments of the present disclosure.

Reference now will be made in detail to embodiments, one or more examples of which are illustrated in the drawings. Each example is provided by way of explanation of the embodiments, not a limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a sensor assembly for an electric machine (e.g., motor, generator) having a stator and a rotor that rotates relative to the stator as a result of electromotive forces between the stator and the rotor. The sensor assembly can include a position sensor mounted to the stator. The position sensor can include a transmit coil and a plurality of receive coils. The sensor assembly can further include a target mounted to the rotor. The target can be configured to be inductively coupled to the transmit coil and the plurality of receive coils when the target passes the position sensor during a revolution of the rotor. More specifically, a measurement signal can be induced in at least one of the transmit coil and the plurality of receive coils when the target passes the position sensor during the revolution. The sensor assembly can include a first circuit mounted to the stator. The first circuit can include one or more electronic components (e.g. processors) configured to determine data indicative of a position of the rotor relative to the stator based, at least in part, on the measurement signal. As will be discussed below in more detail, the sensor assembly can include a second circuit that is mounted to the rotor and includes one or more electronic components (e.g., processors, sensors) associated with obtaining data indicative of one or more parameters (e.g., temperature, velocity, acceleration, etc.) associated with the rotor.

In some implementations, the sensor assembly can include a power generation element configured to generate electrical power needed for powering the one or more electronic components of the second circuit based, at least in part, on an inductive coupling with the transmit coil of the position sensor when the power generation element passes the position sensor during a revolution of the rotor relative to the stator. In some implementations, the power generation element can include a pick-up coil. Furthermore, in some implementations, the target can include the pick-up coil. In this manner, the power generation element (e.g., pick-up coil) can be part of the target. In alternative implementations, the second circuit can include the pick-up coil. In this manner, the power generation element can be part of the second circuit.

The one or more electronic components of the second circuit board can include at least one sensor. For instance, the at least one sensor can include a temperature sensor. In this manner, the power generation element can provide electrical power to the temperature sensor to determine a temperature of the rotor. Alternatively, or additionally, the at least one sensor can include a motion sensor. In this manner, the power generation element can provide electrical power to the motion sensor to obtain data indicative of motion (e.g., speed, acceleration) of the rotor from the motion sensor. It should be appreciated, however, that the circuit can include any suitable sensor to monitor one or more parameters associated with the rotor.

In some implementations, the one or more electronic components of the second circuit can include one or more processors. The one or more processors can be configured to obtain data from the at least one sensor. Furthermore, the one or more processors can be configured to communicate the data to the position sensor. For instance, in some implementations, the one or more processors can be configured to communicate the data to the transmit coil or the plurality of receive coils via the power generation element. For instance, in some implementations, the one or more processors can be configured to communicate the data to the transmit coil or the plurality of receive coils via the pick-up coil.

Alternatively, the one or more processors can be configured to communicate the data to the transmit coil or the plurality of receive coils via a communication coil that is separate from the power generation element. In some implementations, the target can include the communication coil. In this manner, the communication coil can be part of the target. In alternative implementations, the second circuit board can include the communication coil. In this manner, the communication coil can be part of the second circuit.

In some implementations, the one or more processors of the second circuit can be configured to encode the data associated with the at least one sensor in the measurement signal that is induced in the transmit coil or a receive coil of the plurality of receive coils. Alternatively, the one or more processors of the second circuit can be configured to communicate the data associated with the at least one sensor via a separate signal. For instance, in some implementations, the data associated with the at least one sensor can be modulated according to modulation schemes.

The sensor assembly according to the present disclosure can provide numerous technical effects and benefits. For example, the power generation component of the sensor assembly allows the second circuit to obtain electrical power due, at least in part, to inductive coupling between the power generation element and the position sensor when the power generation element passes the position sensor during a revolution of the rotor. In this manner, the at least one sensor of the second circuit can obtain the electrical power needed to obtain data indicative of one or more parameters (e.g., temperature, rotational speed, rotational acceleration, etc.) associated with the rotor.

Referring now to the FIGS., FIG. 1 depicts a position measurement system 100 for an electrical machine having a stationary component (e.g., stator) and a rotational component (e.g., rotor). As shown, the position measurement system 100 can include a position sensor 110. The position sensor 110 can be mounted to the stationary component of the electrical machine. For instance, the position sensor 110 can be disposed on a circuit board mounted to the stationary component.

The position sensor 110 can include a transmit coil 112 having one or more turns. The position sensor 110 can further include a plurality of receive coils 114. Each of the plurality of receive coils 114 can have one or more turns. As shown, the plurality of receive coils 114 can include at least a first receive coil 116 and a second receive coil 118. In some implementations, the first receive coil 116 can have a shape corresponding to a first sine wave. In addition, the second receive coil 118 can have a shape corresponding to a second sine wave that is phase-shifted relative to the first sine wave. In some implementations, the second sine wave can be phase-shifted relative to the first sine wave by 90 degrees. In such implementations, the first receive coil 116 and the second receive coil 118 can be a sine receive coil and a cosine receive coil, respectively. It should be appreciated that, in some implementations, the plurality of receive coils 114 can include more than two (e.g., first receive coil 116 and second receive coil 118) receive coils. For instance, in some implementations, the plurality of receive coils 114 can include three or more separate receive coils.

The position measurement system 100 can include a target 120. In some implementations, the target 120 can be mounted to the rotational component (e.g., rotor) of the electric machine. Alternatively, the target 120 can be integral (e.g., a part of) the rotational component of the electric machine. The target 120 can move relative to the position sensor 110 that is mounted to the stationary component (e.g., stator) of the electrical machine. In some implementations, the target 120 can include a wire loop structure. Alternatively, the target 120 can be a metal circuit board mounted to the rotational component of the electric machine. For instance, the circuit board can be a patterned printed circuit board. Alternatively, the target 120 can be a solid metal component (e.g., stamped metal) that is mounted to the rotational component of the electric machine.

The position measurement system 100 can include processing circuitry 130 associated with the position sensor 110. The processing circuitry 130 can include a transmission ("TX") drive circuit 132 configured to generate an alternating current signal that is provided to the transmit coil 112 of the position sensor 110. In some implementations, the TX drive circuit 132 can include a free running oscillator that generates the alternating current signal at a drive frequency determined by the inductance of the transmit coil 112 and the capacitance of a capacitor (not shown) connected in parallel to the transmit coil 112. In some implementations, the target 120 includes a resonant circuit and the drive frequency is set to the resonant frequency of that resonant circuit.

Supplying the alternating current signal to the transmit coil 112 induces electromotive forces in the first receive coil 116 (e.g., sine receive coil) and the second receive coil 118 (e.g., cosine receive coil), which causes current to flow in the first receive coil 116 and the second receive coil 118. However, due to a layout of the first receive coil 116 and the second receive coil 118 with respect to the layout of the transmit coil 112, the electromotive forces induced directly in the first receive coil 116 and the second receive coil 118 are negligible and therefore cause negligible current to flow in the first receive coil 116 and the second receive coil 118. However, the electromotive forces the transmit coil 112 induces in the plurality of receive coils 114 via the target 120 do cause current signals to flow in each of the plurality of receive coils 114 (e.g., the first receive coil 116 and the second receive coil 118).

In some implementations, each of the plurality of receive coils 114 can be formed from a separate winding such that a separate current flows in each of the plurality of receive coils 114. For instance, the first receive coil 116 and the second receive coil 118 can each be formed from separate windings such that separate currents flow in the first receive coil 116 and the second receive coil 118. Furthermore, the first receive coil 116 and the second receive coil 118 can be coupled to separate terminals (not shown) associated with the processing circuitry 130, with the current flowing in the first receive coil 116 being processed to provide a first output signal 150 and the current flowing in the second receive coil 118 being processed to provide a second output signal 152.

In some implementations, the processing circuitry 130 includes an EMC filtering circuit 134 associated with filtering harmonics associated with current flowing in the first receive coil 116. For instance, the EMC filtering circuit 134 can be associated with filtering harmonics at frequencies that are different than a drive frequency. In this manner, harmonics due to the interference from electrical signals generated by other nearby electrical components can be removed. The filtered electrical signal then goes through a synchronous demodulation circuit 136 in which the filtered electrical signal is mixed with a demodulation signal from the TX drive circuit 132.

The demodulated electrical signal then passes through a low pass filter 138 configured to remove the high frequency components corresponding to harmonics of the drive signal, leaving the baseband component, and then passes through a gain and output buffer circuit 140, which allows an adjustable gain to be applied before being output as the first output signal 150. It should be understood that current induced in the second receive coil 118 also undergoes the EMC filtering circuit 134, the synchronous demodulation circuit 136, the low pass filter 138, and the gain and output buffering circuit 140 before being output as the second output signal 152.

In some implementations, a position of the target 120 relative to the position sensor 110 can be determined based, at least in part, on the first output signal 150 and the second output signal 152. For instance, the position of the target 120 relative to the position sensor 110 can correspond to the arc tangent of the first output signal 150 divided by the second output signal 152. In such implementations, one or more processors 142 of the processing circuitry 130 can be configured to output a signal indicative of the position of the target 120 relative to the position sensor 110.

Figure 2:
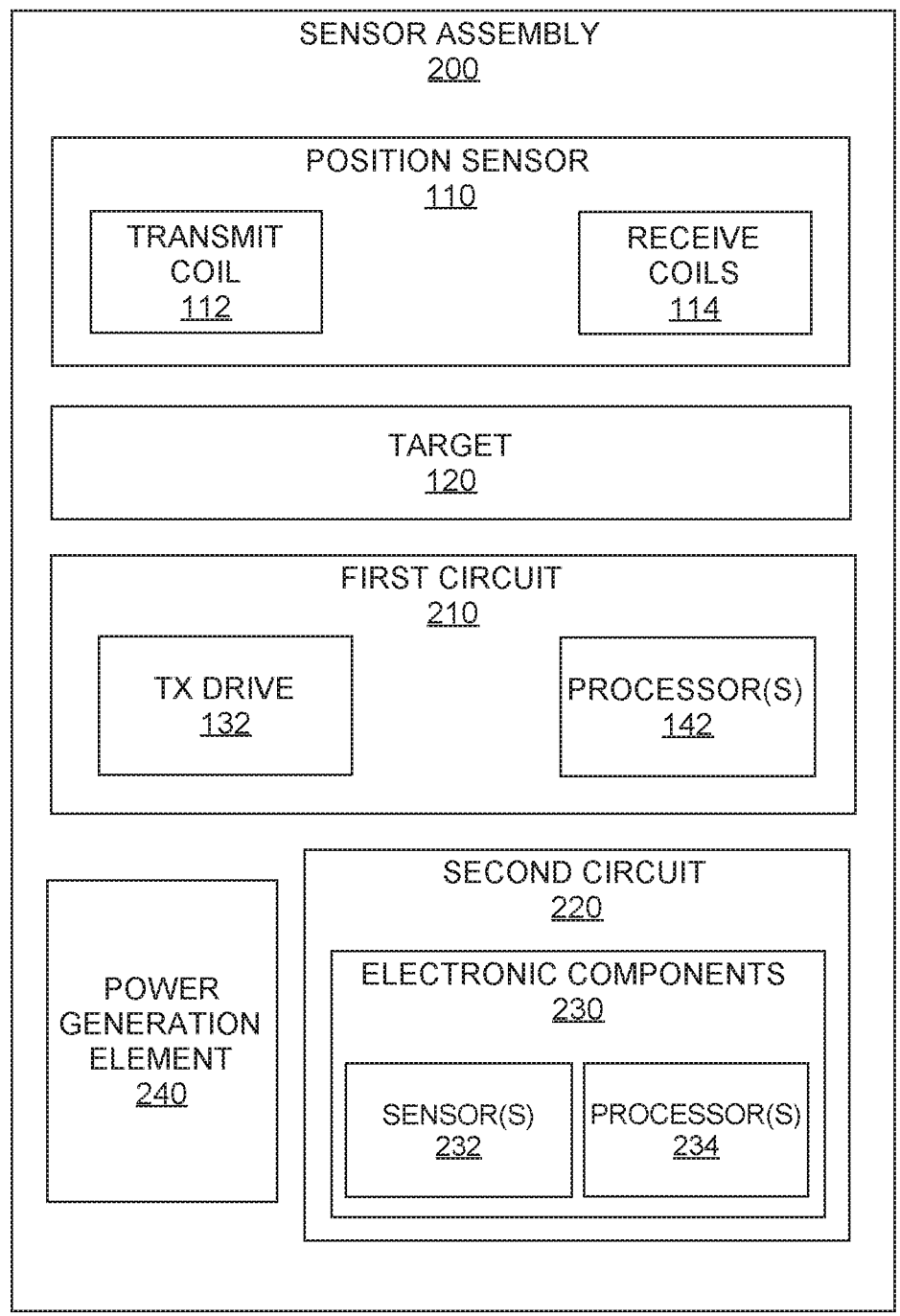
FIG. 2 depicts a sensor assembly for an electric machine according to example embodiments of the present disclosure.
Figure 3:
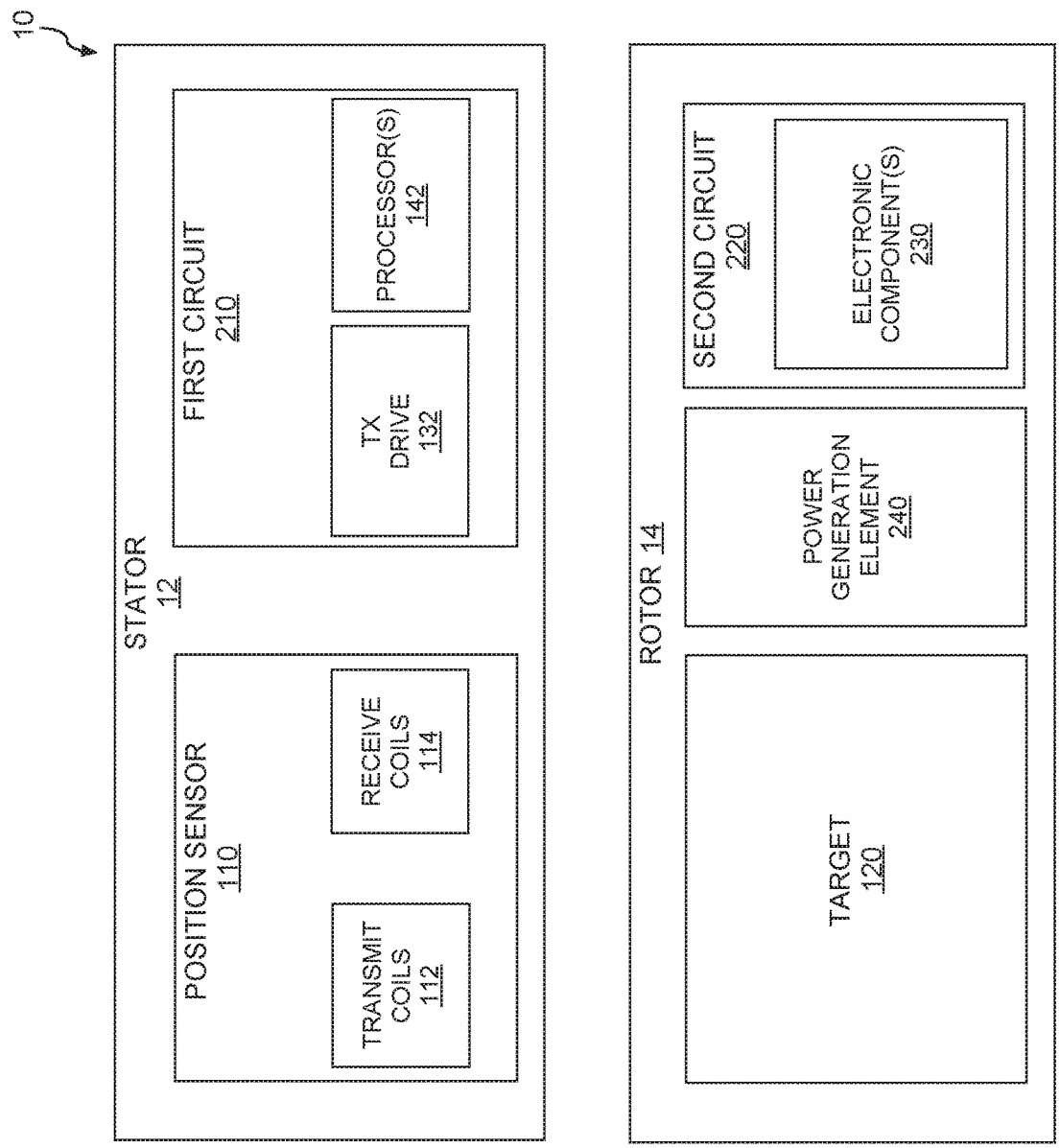
FIG. 3 depicts components of the sensor assembly of FIG. 2 on an electric machine according to example embodiments of the present disclosure.

Referring now to FIGS. 2 and 3, a sensor assembly 200 for an electric machine 10 having a stator 12 and a rotor 14 is provided. The sensor assembly 200 can include one or more components of the position measurement system 100 discussed above with reference to FIG. 1. For instance, the sensor assembly 200 can include the position sensor 110 and the target 120. As shown, the position sensor 110 can be mounted to the stator 12. Conversely, the target 120 can be a standalone component that is mounted to the rotor 14. Alternatively, the target 120 can, as discussed above, be integral with the rotor 14.

The sensor assembly 200 can include a first circuit 210 mounted to the stator 12. The first circuit 210 can include one or more electronic components of the processing circuitry 130 discussed above with reference to the position measurement system 100 of FIG. 1. For instance, the first circuit 210 can include the TX drive circuit 132. In this manner, the first circuit 210 can drive the transmit coil 112 of the position sensor 110 at a given frequency. The first circuit 210 can include the one or more processors 142. The one or more processors 142 can be configured to determine data indicative of a position of the rotor 14 based, at least in part, on a measurement signal that is induced in at least one of the transmit coil 112 and the plurality of receive coils 114 of the position sensor 110 when the target 120 passes the position sensor 110 during a revolution of the rotor 14.

In some implementations, the position sensor 110 and the first circuit 210 can be disposed on a same circuit board. In alternative implementations, the position sensor 110 and first circuit 210 can be disposed on separate circuit boards. For instance, the position sensor 110 can be disposed on a first circuit board mounted to the stator 12. Conversely, the first circuit 210 can be disposed on a second circuit board mounted to the stator 12. In such implementations, the position sensor 110 and the first circuit 210 can be configured to communicate with one another via any suitable electrical connection.

As shown, the sensor assembly 200 can include a second circuit 220 mounted to the rotor 14. For instance, in some implementations, the second circuit 220 can be disposed on a circuit board mounted to the rotor 14. The second circuit 220 can include one or more electronic components 230 (e.g., processors, sensors) associated with monitoring one or more parameters (e.g., temperature, velocity, acceleration, etc.) associated with the rotor 14. For instance, the one or more electronic components 230 of the second circuit 220 can include at least one sensor 232. The at least one sensor 232 can, in some implementations, include a temperature sensor (e.g., thermocouple). In this manner, the temperature sensor can obtain data (e.g., temperature readings) indicative of a temperature of the rotor 14. Alternatively, or additionally, the at least one sensor 232 can include a motion sensor (e.g., accelerometer). In this manner, the motion sensor can obtain data indicative of motion (e.g., speed, acceleration) of the rotor 14. It should be appreciated, however, that the at least one sensor 232 can include any suitable sensor configured to monitor a parameter associated with the rotor 14.

In some implementations, the one or more electronic components 230 of the second circuit 220 can include one or more processors 234. The one or more processors 234 can be communicatively coupled with the at least one sensor 232. In this manner, the one or more processors 234 can be configured to obtain data via the at least one sensor 232. For instance, the one or more processors 234 can be configured to obtain data indicative of a temperature of the rotor 14. Alternatively, or additionally, the one or more processors 234 can be configured to obtain data indicative of motion of the rotor 14.

In some implementations, the second circuit 220 can be integral (e.g. part of) with the target 120. For instance, in some implementations, the target 120 can be a coil of which the second circuit 220 is integral. In such implementations, the one or more electronic components 230 can be positioned closer to an inner diameter of the target 120 than an outer diameter of the target 120. More specifically, the at least one sensor 232 of the second circuit 220 can be positioned closer to the inner diameter of the target 120 than the outer diameter of the target 120.

As shown, the sensor assembly 200 can include a power generation element 240 on the rotor 14. The power generation element 240 can be configured to generate electrical power that can be used to power the one or more electronic components 230 of the second circuit 220. More specifically, the electrical power can be generated based, at least in part, on the power generation element 240 being inductive coupling to the transmit coil 112 when the power generation element 240 passes the position sensor 110 during a revolution of the rotor 14 relative to the stator 12.

Figure 4:
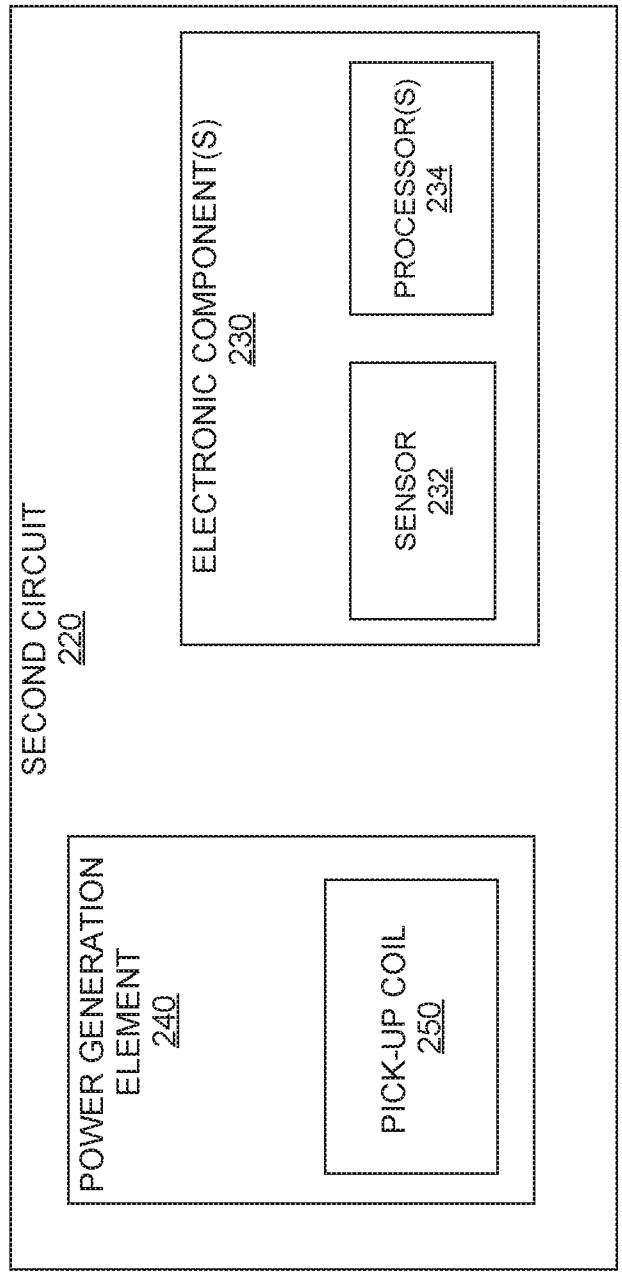
FIG. 4 depicts a second circuit of a sensor assembly according to an example embodiment of the present disclosure.
Figure 5:
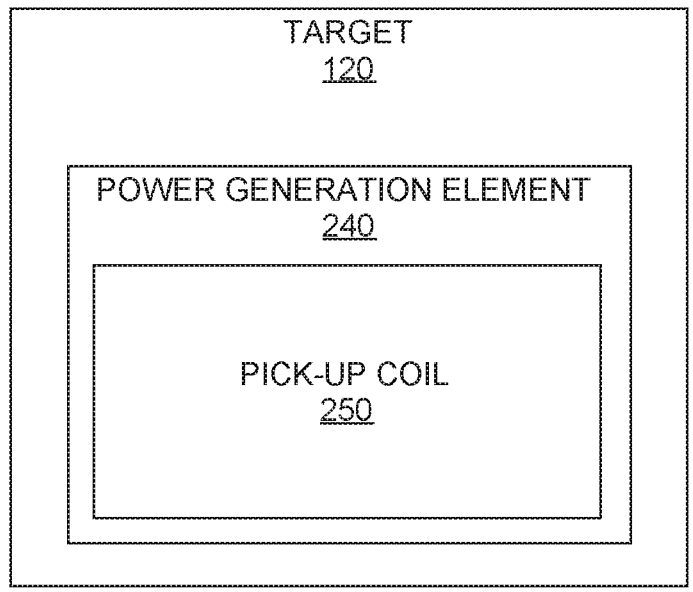
FIG. 5 depicts a target of the sensor assembly according to an example embodiment of the present disclosure

Referring now to FIGS. 4 and 5, the second circuit 220 (FIG. 4) or the target 120 (FIG. 5) can include the power generation element 240. In this manner, the power generation element 240 can be part of the second circuit 220 or the target 120. In some implementations, the power generation element 240 can include a pick-up coil 250. The pick-up coil 250 can be configured to generate electrical power for powering the one or more electronic components 230 of the second circuit 220 when the pick-up coil 250 is inductively coupled to the transmit coil 112 during a revolution of the rotor 14. In some implementations, a number of turns associated with the pick-up coil 250 can be determined based, at least in part, on a voltage requirement associated with the second circuit 220. As will be discussed below, the one or more processors 234 can be configured to communicate data associated with the at least one sensor 232 via the pick-up coil 250.

Figure 6:
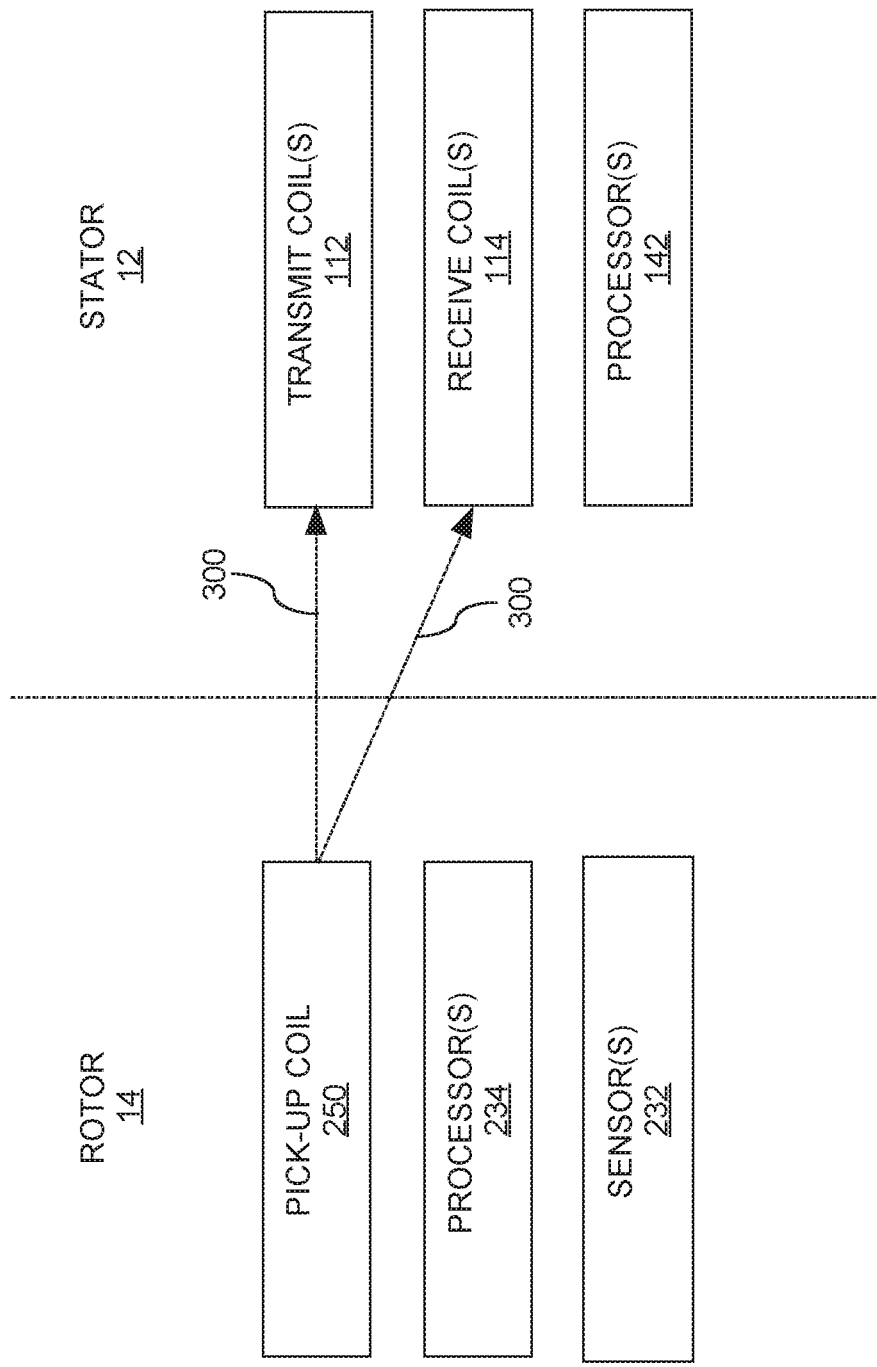
FIG. 6 depicts a pick-up coil of the sensor assembly inductively coupled to a position sensor of the sensor assembly according to example embodiments of the present disclosure.

Referring now to FIG. 6, in some implementations, the pick-up coil 250 can be inductively coupled to the transmit coil 112 of the position sensor 110 (shown in FIG. 3) when the pick-up coil 250 passes the position sensor 110 during a revolution of the rotor 14 relative to the stator 12. In this manner, the data 300 associated with the at least one sensor 232 can be communicated to the position sensor 110, specifically the transmit coil 112 thereof, via the pick-up coil 250. In such implementations, the one or more processors 234 can be configured to adjust an impedance of the pick-up coil 250 to encode the data 300 in the measurement signal that is induced in the transmit coil 112 when the pick-up coil 250 is inductively coupled to the transmit coil 112.

In some implementations, the pick-up coil 250 can be inductively coupled to at least one receive coil of the plurality of receive coils 114 of the position sensor 110 (shown in FIG. 3) when the pick-up coil 250 passes the position sensor 110 during a revolution of the rotor 14 relative to the stator 12. In this manner, the data 300 associated with the at least one sensor 232 can be communicated to the position sensor 110, specifically the at least one receive coil of the plurality of receive coils 114 thereof, via the pick-up coil 250. In such implementations, the one or more processors 234 can be configured to adjust an impedance of the pick-up coil 250 to encode the data 300 in the measurement signal induced in the at least one receive coil of the plurality of receive coils 114 when the pick-up coil 250 is inductively coupled to the at least one receive coil.

It should be understood that the one or more processors 234 can be configured to adjust the impedance of the pick-up coil 250 in any suitable manner. For instance, in some implementations, the one or more processors 234 can be configured to electrically couple the pick-up coil 250 to a passive electrical component (not shown) in a parallel configuration or a series configuration to adjust the impedance of the pick-up coil 250. The passive electrical component can include a capacitor, resistor, inductor, or any other suitable type of passive electrical component that can be electrically coupled to the pick-up coil 250 to adjust the impedance of the pick-up coil 250.

In some implementations, the pick-up coil 250 can be associated with a magnetic circuit. The magnetic circuit can be formed from any suitable ferromagnetic material. In this manner, inductive coupling with at least one of the transmit coil 112 and the plurality of receive coils 114 can be improved. In alternative implementations, the pick-up coil 250 can be associated with a resonant circuit.

The first circuit 210 coupled to the stator 12 can be configured to process a signal received from the power generation element 240 (e.g., pick-up coil 250) to obtain the data 300 associated with the at least one sensor 232 of the second circuit 220. In some implementations, the signal can be the measurement signal induced in one or more of the plurality of receive coil 114. In such implementations, the one or more processors 234 of the second circuit 220 can be configured to induce the measurement signal having the data 300 encoded thereon in the transmit coil 112 and the receive coils 114 in a time-synchronized manner to accommodate lock-in detection techniques implemented by the first circuit 210.

In some implementations, a frequency associated with the signal obtained from the pick-up coil 250 can be modulated according to a frequency modulation scheme to indicate that the signal includes data 300 associated with the at least one sensor 232 of the second circuit 220. In such implementations, the first circuit 210 can be configured to determine the data 300 associated with the at least one sensor 232 of the second circuit 220 is being communicated to the first circuit 210 based, at least in part, on the frequency of the signal being modulated according to the frequency modulation scheme.

In some implementations, an amplitude associated with the signal obtained from the pick-up coil 250 can be modulated according to an amplitude modulation scheme to indicate that the signal includes data 300 associated with the at least one sensor 232 of the second circuit 220. In such implementations, the first circuit 210 can be configured to determine the data 300 associated with the at least one sensor 232 of the second circuit 220 is being communicated to the first circuit 210 based, at least in part, on the amplitude of the signal being modulated according to the amplitude modulation scheme.

In some implementations, a phase of the signal obtained from the pick-up coil 250 can be modulated according to a phase modulation scheme to indicate that the signal includes data 300 associated with the at least one sensor 232 of the second circuit 220. In such implementations, the first circuit 210 can be configured to determine the data 300 associated with the at least one sensor 232 of the second circuit 220 is being communicated to the first circuit 210 based, at least in part, on the phase of the signal being modulated according to the phase modulation scheme.

Figure 7:
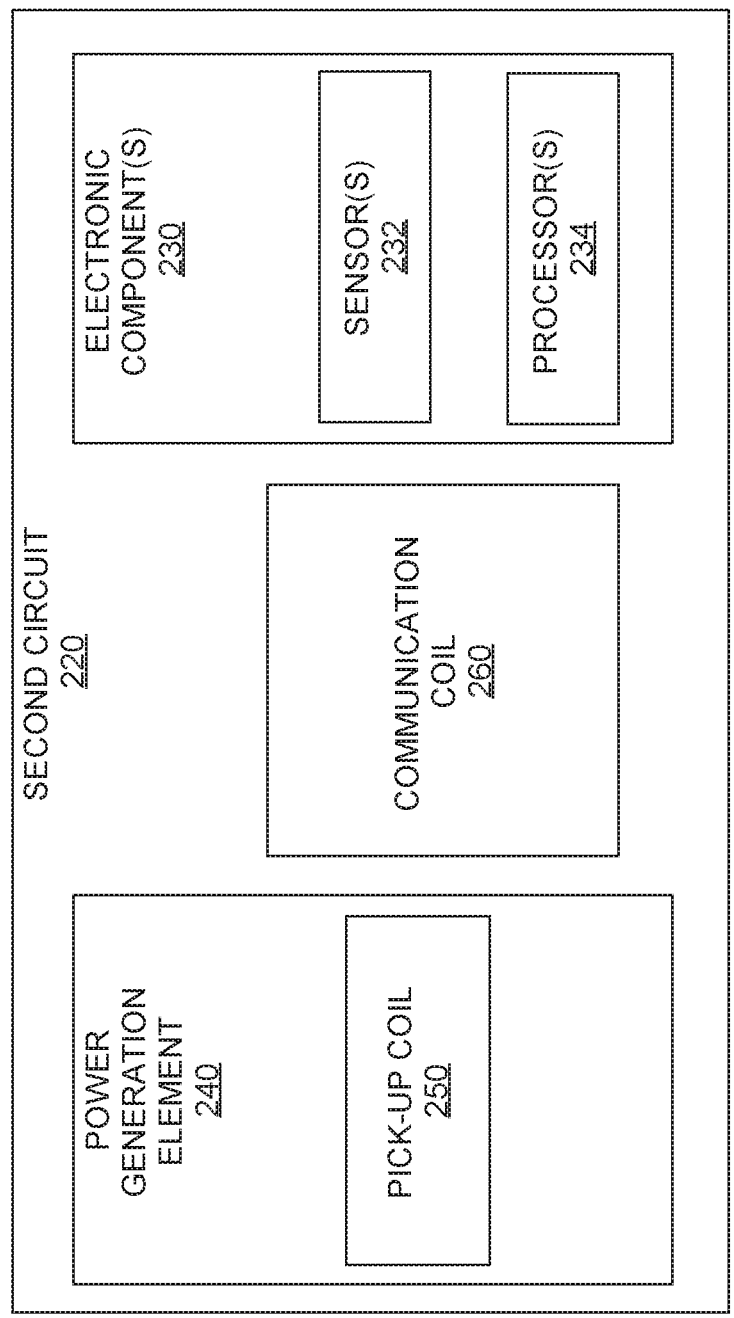
FIG. 7 depicts a second circuit of a sensor assembly according to another example embodiment of the present disclosure.
Figure 8:
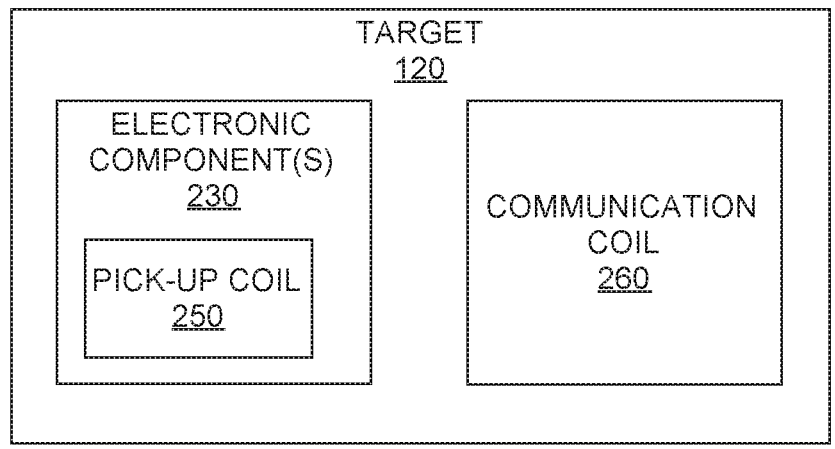
FIG. 8 depicts a target of the sensor assembly according to another example embodiment of the present disclosure.

Referring now to FIGS. 7 and 8, the sensor assembly 200 can include a communication coil 260 that is separate from the power generation element 240. In some implementations, the target 120 can include the power generation element 240 and the communication coil 260. In this manner, the pick-up coil 250 and the communication coil 260 can be part of the target 120. In alternative implementations, the second circuit 220 can include the power generation element 240 and the communication coil 260. In this manner, the pick-up coil 250 and the communication coil 260 can be part of the second circuit 220. As will be discussed below, the data 300 associated with the at least one sensor 232 via the communication coil 260.

Figure 9:
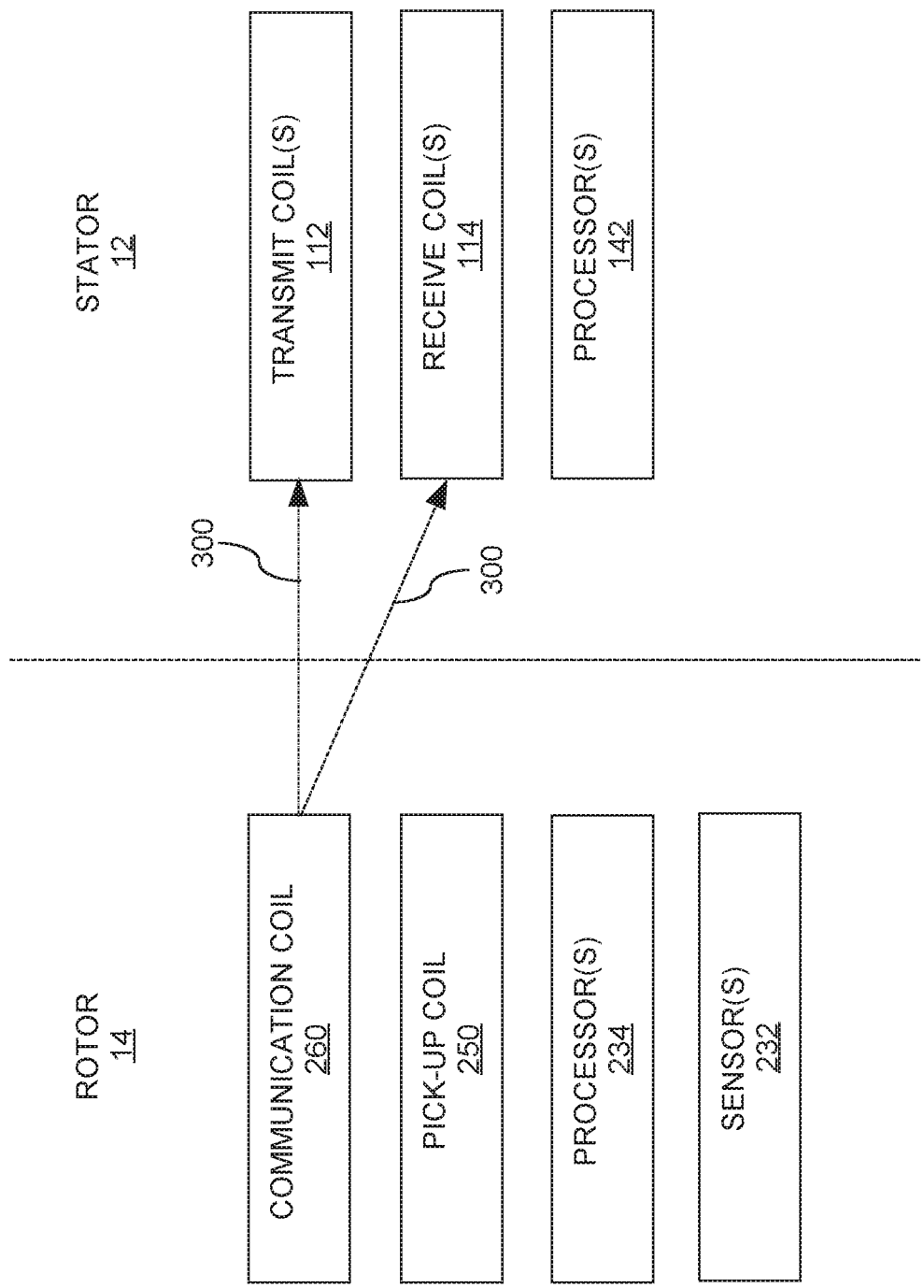
FIG. 9 depicts a communication-up coil of the sensor assembly inductively coupled to a position sensor of the sensor assembly according to example embodiments of the present disclosure.

Referring now to FIG. 9, in some implementations, the communication coil 260 can be inductively coupled to the transmit coil 112 of the position sensor 110 (shown in FIG. 3) when the communication coil 260 passes the position sensor 110 during a revolution of the rotor 14 relative to the stator 12. In this manner, the data 300 associated with the at least one sensor 232 can be communicated to the position sensor 110, specifically the transmit coil 112 thereof, via the communication coil 260. In such implementations, the one or more processors 234 can be configured to adjust an impedance of the communication coil 260 to encode the data 300 in the measurement signal induced in the transmit coil 112 when the communication coil 260 is inductively coupled to the transmit coil 112.

In some implementations, the communication coil 260 can be inductively coupled to at least one receive coil of the plurality of receive coils 114 of the position sensor 110 (shown in FIG. 3) when the communication coil 260 passes the position sensor during a revolution of the rotor 14 relative to the stator 12. In this manner, the data 300 associated with the at least one sensor 232 can be communicated to the position sensor 110, specifically the receive coils 114 thereof, via the communication coil 260 associated with the second circuit 220. In such implementations, the one or more processors 234 can be configured to adjust an impedance of the communication coil 260 to encode the data 300 in the measurement signal induced in the at least one receive coil of the plurality of receive coils 114 when the communication coil 260 is inductively coupled to the at least one receive coil.

It should be understood that the one or more processors 234 can be configured to adjust the impedance of the communication coil 260 in any suitable manner. For instance, in some implementations, the one or more processors 234 can be configured to electrically couple the communication coil 260 to a passive electrical component (not shown) in a parallel configuration or a series configuration to adjust the impedance of the communication coil 260. The passive electrical component can include a capacitor, resistor, inductor, or any other suitable type of passive electrical component that can be electrically coupled to the communication coil 260 to adjust the impedance of the communication coil 260.

In some implementations, at least one of the pick-up coil 250 and the communication coil 260 can be associated with a magnetic circuit. The magnetic circuit can be formed from any suitable ferromagnetic material. In this manner, inductive coupling with at least one of the transmit coil 112 and the plurality of receive coils 114 can be improved. In alternative implementations, at least one of the pick-up coil 250 and the communication coil 260 can be associated with a resonant circuit.

The first circuit 210 coupled to the stator 12 can be configured to process a signal received from the communication coil 260 on the rotor 14 to obtain the data 300 associated with the at least one sensor 232 of the second circuit 220. In some implementations, the signal can be the measurement signal induced in one or more of the plurality of receive coil 114. In such implementations, the one or more processors 234 of the second circuit 220 can be configured to induce the measurement signal having the data 300 encoded thereon in the transmit coil 112 and the receive coils 114 in a time-synchronized manner to accommodate lock-in detection techniques implemented by the first circuit 210.

In some implementations, a frequency associated with the signal obtained from the communication coil 260 can be modulated according to a frequency modulation scheme to indicate that the signal includes data 300 associated with the at least one sensor 232 of the second circuit 220. In such implementations, the first circuit 210 can be configured to determine the data 300 associated with the at least one sensor 232 of the second circuit 220 is being communicated to the first circuit 210 based, at least in part, on the frequency of the signal being modulated according to the frequency modulation scheme.

In some implementations, an amplitude associated with the signal obtained from the communication coil 260 can be modulated according to an amplitude modulation scheme to indicate that the signal includes data 300 associated with the at least one sensor 232 of the second circuit 220. In such implementations, the first circuit 210 can be configured to determine the data 300 associated with the at least one sensor 232 of the second circuit 220 is being communicated to the first circuit 210 based, at least in part, on the amplitude of the signal being modulated according to the amplitude modulation scheme.

In some implementations, a phase of the signal obtained from the communication coil 260 can be modulated according to a phase modulation scheme to indicate that the signal includes data 300 associated with the at least one sensor 232 of the second circuit 220. In such implementations, the first circuit 210 can be configured to determine the data 300 associated with the at least one sensor 232 of the second circuit 220 is being communicated to the first circuit 210 based, at least in part, on the phase of the signal being modulated according to the phase modulation scheme.

Figure 10:
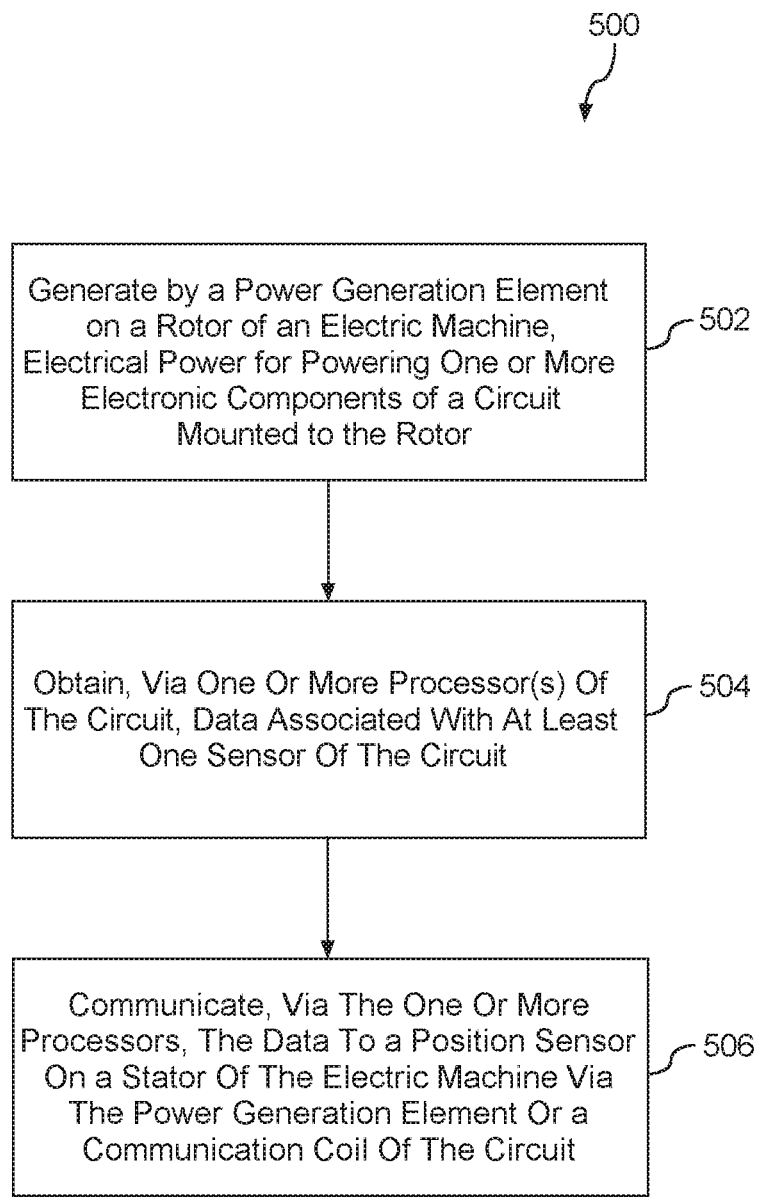
FIG. 10 depicts a method of communicating data associated with a rotor of an electric machine to a position sensor mounted to a stator of the electric machine according to example embodiments of the present disclosure.

Referring now to FIG. 10, a flow diagram of an example method 500 for communicating data associated with a rotor of an electric machine to a position sensor coupled to a stator of the electric machine according to example embodiments of the present disclosure. The method 500 can be implemented, for instance, using the sensor assembly discussed above with reference to FIG. 2. FIG. 10 depicts steps performed in a particular order for purposes of illustration and discussion. Those of ordinary skill in the art, using the disclosures provided herein, will understand that various steps of any of the methods described herein can be adapted, omitted, rearranged, include steps not illustrated, performed simultaneously, and/or modified in various ways without deviating from the scope of the present disclosure.

At (502), the method 500 includes generating, by a power generation component on the rotor, electrical power for powering one or more electronic components of a circuit mounted to the rotor based, at least in part, on an inductive coupling between the power generation element and a transmit coil of the position sensor during a revolution of the rotor relative to the stator. In some implementations, the target can include the power generation element. In this manner, the power generation element can be part of the target. In alternative implementations, the circuit mounted to the rotor can include the power generation element.

At (504), the method 500 includes obtaining, via one or more processors of the circuit, data associated with at least one sensor of the circuit. In some implementations, the data associated with the at least one sensor can include temperature data indicative of a temperature of the rotor of the electric machine. Alternatively or additionally, the data associated with the at least one sensor can include motion data indicative of motion (e.g., speed, acceleration) of the rotor.

At (506), the method 500 includes communicating, via the one or more processors, the data to the position sensor via the power generation component or a communication coil that is separate from the power generation element. In some implementations, communicating the data to the position sensor can include communicating, via the one or more processors, the data to a transmit coil of the position sensor via the power generation component (e.g., pick-up coil or wire-shaped target) or the communication coil. In such implementations, communicating the data to the transmit coil via the power generation component or the communication coil includes adjusting an impedance of the pick-up coil or the communication coil to encode the data in a measurement signal induced in the transmit coil.

In alternative implementations, communicating the data to the position sensor can include communicating, via the one or more processors, the data to at least one of the plurality of receive coils via the power generation component (e.g., pick-up coil or wire-shaped target) or the communication coil. In such implementations, communicating the data to the transmit coil via the power generation component or the communication coil includes adjusting an impedance of the pick-up coil or the communication coil to encode the data in a measurement signal induced in the at least one receive coil.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A sensor assembly for an electric machine comprising a stator and a rotor, the sensor assembly comprising:
    a position sensor mounted to the stator, the position sensor comprising a transmit coil and a plurality of receive coils;
    a target configured to be inductively coupled to the transmit coil and the plurality of receive coils when the target passes the position sensor during a revolution of the rotor relative to the stator;
    a first circuit mounted to the stator, the first circuit operable to determine data indicative of a position of the rotor based, at least in part, on a measurement signal induced in the plurality of receive coils when the target passes the position sensor;
    a second circuit mounted to the rotor, the second circuit comprising one or more electronic components associated with monitoring one or more parameters of the rotor, the one or more electronic components comprise at least one sensor; and
    a power generation element configured to generate electrical power needed for powering the one or more electronic components of the second circuit based, at least in part, on an inductive coupling with the transmit coil when the power generation element passes the position sensor during the revolution of the rotor, the power generation element comprises a pick-up coil;
    the one or more electronic components of the second circuit further comprise one or more processors configured to perform operations, the operations comprising:
        communicating data associated with the at least one sensor to the position sensor via the pick-up coil or a communication coil that is separate from the pick-up coil, the data comprises communicating the data to the transmit coil of the position sensor via the pick-up coil or the communication coil.

2. The sensor assembly of claim 1, wherein the target includes the power generation element.

3. The sensor assembly of claim 1, wherein the second circuit includes the power generation element.

4. The sensor assembly of claim 1, wherein the at least one sensor comprises a temperature sensor.

5. The sensor assembly of claim 1, wherein the at least one sensor comprises a motion sensor.

6. The sensor assembly of claim 1, wherein communicating the data associated with the at least one sensor comprises adjusting an impedance of the pick-up coil or the communication coil to encode the data in the measurement signal induced in the transmit coil.

7. The sensor assembly of claim 1, wherein communicating the data associated with the at least one sensor comprises communicating the data to at least one receive coil of the plurality of receive coils via the pick-up coil or the communication coil.

8. The sensor assembly of claim 7, wherein communicating the data associated with the at least one sensor further comprises adjusting an impedance of the pick-up coil or the communication coil to encode the data in the measurement signal induced in the at least one receive coil.

9. The sensor assembly of claim 1, wherein a number of turns on the pick-up coil or the communication coil is based, at least in part, on a voltage requirement associated with the second circuit.

* * * * *